(12) United States Patent
Utsumi

(10) Patent No.: US 7,555,602 B2
(45) Date of Patent: Jun. 30, 2009

(54) DATA PROCESSING APPARATUS AND METHOD FOR RESTORING A FILE SYSTEM

(75) Inventor: Kazuyoshi Utsumi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 285 days.

(21) Appl. No.: 11/464,752

(22) Filed: Aug. 15, 2006

(65) Prior Publication Data

US 2007/0043903 A1 Feb. 22, 2007

(30) Foreign Application Priority Data

Aug. 19, 2005 (JP) ............................. 2005-238353
Jun. 15, 2006 (JP) ............................. 2006-165894

(51) Int. Cl.
*G06F 13/00* (2006.01)
*G06F 12/12* (2006.01)

(52) U.S. Cl. ...................... 711/115; 707/200
(58) Field of Classification Search .............. None
See application file for complete search history.

(56) References Cited

U.S. PATENT DOCUMENTS 5,734,894 A * 3/1998 Adamson et al. ............ 707/200
7,197,143 B2 * 3/2007 Duerr et al. ................. 380/229
2006/0277223 A1* 12/2006 Gupta et al. ................ 707/201

FOREIGN PATENT DOCUMENTS

| JP | 05-002519   | 1/1993  |
| JP | 08-227372   | 9/1996  |
| JP | 08-293152   | 11/1996 |
| JP | 2003-085056 | 3/2003  |
| JP | 2003-304438 | 10/2003 |

* cited by examiner

*Primary Examiner*—Hyung S Sough
*Assistant Examiner*—Duc T Doan
(74) *Attorney, Agent, or Firm*—Hogan & Hartson LLP

(57) ABSTRACT

A data processing apparatus for writing data to a recording medium having a predetermined file system configured therein includes the following elements: an insertion portion that removably holds the recording medium, the data processing apparatus writing data to the recording medium inserted in the insertion portion; an insertion/removal detector that detects that the recording medium is inserted in or removed from the insertion portion; a writing state storage unit that stores, when the insertion/removal detector detects removal of the recording medium, a data writing state upon removal of the recording medium; and a restoration/analysis determining unit that determines, when the insertion/removal detector detects insertion of the recording medium, whether it is necessary to perform analysis regarding restoration of the file system configured in the inserted recording medium on the basis of the state stored in the writing state storage unit.

10 Claims, 8 Drawing Sheets

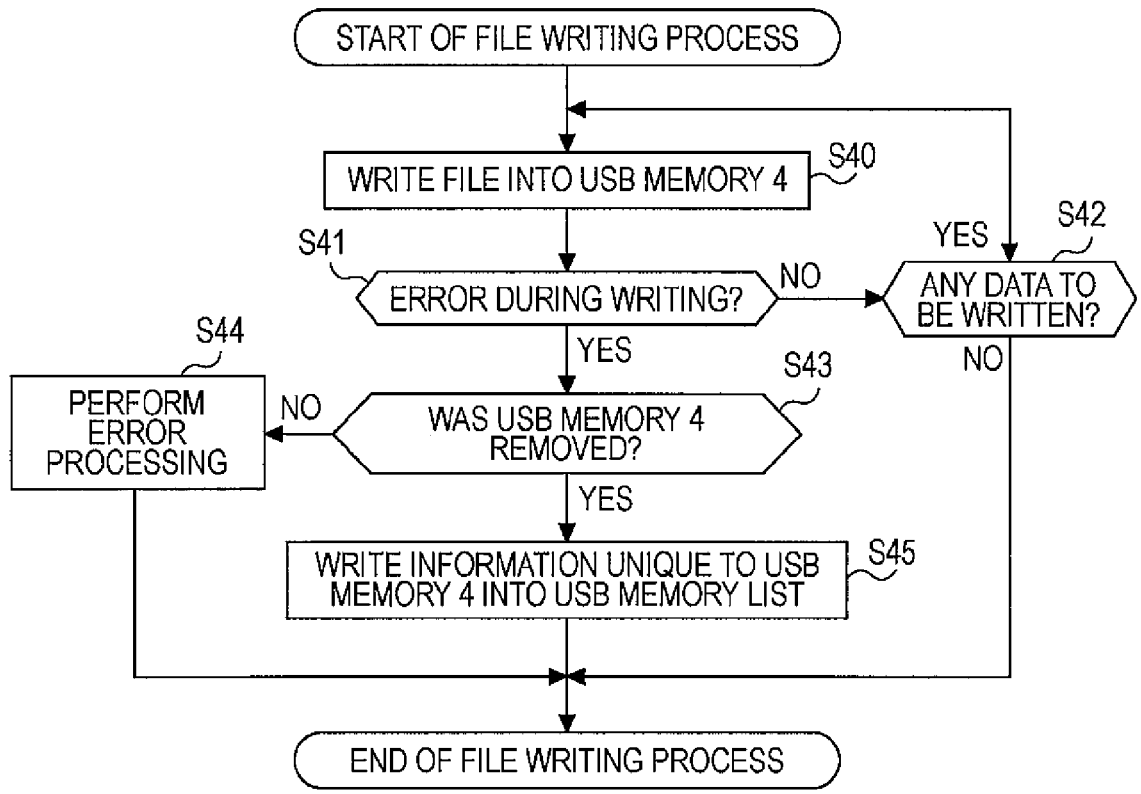

DATA PROCESSING APPARATUS AND METHOD FOR RESTORING A FILE SYSTEM

BACKGROUND

1. Technical Field

The present invention relates to data processing apparatuses and methods, control programs therefor, and recording media having the programs recorded thereon.

2. Related Art

Universal serial bus (USB) memories that can be directly inserted in and removed from USB interfaces of personal computers (hereinafter abbreviated as "PCs"), printers, scanners, and the like have recently become widely used as highly portable removable media. In USB memories, a file system called a file allocation table (FAT) is configured in a storage region of an internal memory to manage recorded data. In the FAT file system, recorded data and a management table for managing the recorded data are recorded in different regions. Desired data can be accessed by referring to the management table. When writing data, data is recorded in a data region and the management table is updated so that the written data can be managed.

The management table may sometimes become inconsistent with the actually stored data. In particular, since USB interfaces enable so-called "hot swapping" that allows USB devices to be inserted in and removed from, for example, a PC, while it is operating, a USB memory may be removed accidentally or intentionally by the user, while data is being written to the USB memory.

When the USB memory is removed while data is being written, the data writing is forcibly interrupted. As a result, the logical consistency between the management table and the data stored in the data region cannot be guaranteed, and the data stored in the file system cannot be read accurately. A storage region may be allocated in the management table for the data that has not actually been stored, and the available storage region may be thereby reduced.

In order to avoid such a failure, operating systems such as Windows® come equipped with a function of checking file systems and repairing errors of the file systems, and such an operating system executes the function to restore and analyze the file systems in response to a user's instruction. A file system is analyzed to determine whether it is necessary to restore the file system. When the file system is restored, the file system errors are eliminated to recover the consistent and normal file system.

For a user, however, it is not clear when the file system should be restored. Therefore, the user may instruct the operating system to execute the function of restoring and analyzing the file system when it is unnecessary to do so or the user may continue using the inconsistent file system, without knowing that it is necessary to restore the file system.

In JP-A-5-2519, when a file system is accessed, the restoration of the file system is started in accordance with the previous state of a computing system at the time the computing system was shut down. Accordingly, when the computing system was not shut down properly, it is very likely that the data writing was interrupted and forcibly terminated, thereby causing file system errors. It is thus determined that it is necessary to restore the file system.

It may be determined, at a particular time, whether it is necessary to restore a file system in a removable recording medium, such as a USB memory. For example, JP-A-2003-85056 describes a technique for determining whether to restore a memory upon activation of a system. JP-A-2003-304438 describes a technique for determining whether to restore a memory upon insertion of the memory. JP-A-8-227372 describes a technique for determining whether to restore a memory upon access of a file stored in the memory.

In JP-A-5-2519, it is determined whether to restore the file system on the basis of the state of the computing system at the time the computing system was shut down. It is thus impossible to apply this technique to a file system configured in a recording medium, such as a USB memory, that can be inserted in and removed from a system, while the system is operating. Since the technique described in JP-A-2003-85056 determines whether to restore the memory upon activation of the system (upon turning on the power), the technique cannot be similarly applied to a file system in a recording medium that can be inserted in and removed from a system, while the system is operating.

The techniques described in JP-A-2003-304438 and JP-A-8-227372 involve always analyzing the memory at a predetermined time to determine the need to restore the memory, the relatively time-consuming analysis of the memory is performed even when it is not always necessary to restore the memory. As a result, the activation of the system takes a longer time, or the system resources are allocated to the analysis at the particular time. Therefore, it is very difficult to efficiently maintain a normal file system.

SUMMARY

An advantage of some aspects of the invention is that it provides a data processing apparatus and method for efficiently and appropriately determining whether to restore a file system in a removable recording medium and efficiently maintaining a normal file system, a control program therefor, and a recording medium having the program recorded thereon.

According to an aspect of the invention, there is provided a data processing apparatus for writing data to a recording medium having a predetermined file system configured therein. The data processing apparatus includes the following elements: an insertion portion that removably holds the recording medium, the data processing apparatus writing data to the recording medium inserted in the insertion portion; an insertion/removal detector that detects that the recording medium is inserted in or removed from the insertion portion; a writing state storage unit that stores, when the insertion/removal detector detects removal of the recording medium, a data writing state upon removal of the recording medium; and a restoration/analysis determining unit that determines, when the insertion/removal detector detects insertion of the recording medium, whether it is necessary to perform analysis regarding restoration of the file system configured in the inserted recording medium on the basis of the state stored in the writing state storage unit.

With this arrangement, when the insertion/removal detector detects removal of the recording medium, it is determined on the basis of the data writing state upon removal of the recording medium whether it is necessary to analyze the file system configured in the inserted recording medium. Thus, whether or not it is necessary to restore the file system can be appropriately determined. Upon removal of the recording medium during reading or when reading or writing is not taking place, there will be no inconsistency in the file system. Thus, it can be appropriately determined that it is unnecessary to restore or analyze the file system. By not analyzing the file system when it is unnecessary to do so, the file system can be activated more quickly.

It is preferable that the writing state storage unit store information indicating whether the recording medium is removed from the insertion portion while data is being written to the recording medium. When the restoration/analysis determining unit refers to the information stored in the writing state storage unit and determines that the recording medium is removed from the insertion portion while data is being written to the recording medium, it is preferable that the restoration/analysis determining unit determine that it is necessary to perform analysis regarding restoration of the file system in the recording medium inserted in the insertion portion.

Accordingly, it can be determined whether it is necessary to perform analysis for restoration of the file system in the recording medium that was removed from the insertion portion while data was being written by referring to the information stored in the writing state storage unit. It is thus possible to determine whether or not it is necessary to perform analysis for restoration in an appropriate manner.

When removal of the recording medium from the insertion portion is detected while data is being written to the recording medium, it is preferable that the writing state storage unit store identification information for identifying the removed recording medium. When the identification information stored in the writing state storage unit coincides with identification information of the inserted recording medium, it is preferable that the restoration/analysis determining unit determine that it is necessary to perform analysis regarding restoration of the file system in the recording medium inserted in the insertion portion.

Accordingly, upon removal of the recording medium while data is being written, identification information of the removed recording medium is stored, and, upon insertion of the recording medium, the file system configured in the recording medium is analyzed when the stored identification information coincides with identification information of the inserted recording medium. The recording medium that was removed while data was being written is analyzed and, if necessary, restored. Upon insertion of another recording medium, it is not determined that it is necessary to restore this recording medium. Thus, whether it is necessary to restore the file system can be determined for each recording medium.

Preferably in this case, the writing state storage unit further stores a file name of a file being written to the recording medium when removal of the recording medium is detected while data is being written to the recording medium.

When removal of the recording medium from the insertion portion is detected while data is being written to the recording medium, it is preferable that the writing state storage unit store a file name of a file being written to the recording medium. When the file name stored in the writing state storage unit coincides with a file name of a file stored in the recording medium inserted in the insertion portion, it is preferable that the restoration/analysis determining unit determine that it is necessary to perform analysis regarding restoration of the file system in the recording medium inserted in the insertion portion.

Accordingly, upon removal of the recording medium while a file is being written to the recording medium inserted in the insertion portion, only the recording medium that stores a file having a file name that coincides with the file name of the file being written upon removal of the recording medium is restored. Whether it is necessary to perform restoration can be determined for each recording medium.

It is preferable that the data processing apparatus further include a file system analyzing and restoring unit that analyzes or analyzes and restores the file system in the recording medium determined to be necessary to be analyzed.

In this manner, a normal file system can be efficiently maintained by analyzing the file system in the recording medium determined to be necessary to be analyzed and, if necessary, by restoring the file system.

It is preferable that the data processing apparatus further include a file system analyzing and restoring unit that analyzes or analyzes and restores data in the file having the file name that coincides with the file name stored in the writing state storage unit, the file being in the recording medium determined to be necessary to be analyzed.

Accordingly, data in a file being written upon removal of the recording medium can be restored. A normal file system can be maintained in a more efficient manner.

The file system may be restored by deleting a file being written upon removal of the recording medium during writing. In this case, the file system can be efficiently maintained in a more simplified manner.

It is preferable that the data processing apparatus further include a message issuing unit that issues a message regarding the restoration to the user.

According to another aspect of the invention, there is provided a data processing apparatus for writing data to a recording medium having a predetermined file system configured therein. The data processing apparatus includes the following elements: an insertion portion that removably holds the recording medium, the data processing apparatus writing data to the recording medium inserted in the insertion portion; an insertion/removal detector that detects that the recording medium is inserted in or removed from the insertion portion; a writing state storage unit that stores, when the insertion/removal detector detects removal of the recording medium, a data writing state upon removal of the recording medium; and a restoration determining unit that determines, when the insertion/removal detector detects insertion of the recording medium, whether it is necessary to restore the file system configured in the inserted recording medium on the basis of the state stored in the writing state storage unit.

Accordingly, the necessity for restoration can be appropriately determined without performing the time-consuming analysis every time.

According to a further aspect of the invention, there is provided a data processing method for writing data to a recording medium inserted in an insertion portion that removably holds the recording medium having a predetermined file system configured therein. The data processing method includes detecting that the recording medium is inserted in or removed from the insertion portion; storing, when removal of the recording medium is detected, a data writing state upon removal of the recording medium; and determining, when insertion of the recording medium is detected, whether it is necessary to perform analysis regarding restoration of the file system configured in the inserted recording medium on the basis of the stored state.

According to a still further aspect of the invention, there is provided a program or a recording medium having the program recorded thereon. That is, there is provided a control program for writing data to a recording medium inserted in an insertion portion that removably holds the recording medium having a predetermined file system configured therein. The program allows a controller of a data processing apparatus having the insertion portion to execute a process including detecting that the recording medium is inserted in or removed from the insertion portion; storing, when removal of the recording medium is detected, a data writing state upon removal of the recording medium; and determining, when insertion of the recording medium is detected, whether it is necessary to perform analysis regarding restoration of the file system configured in the inserted recording medium on the basis of the stored state. The recording medium having the program recorded thereon includes various types of computer-readable media, such as a flexible disk, a compact disc read-only memory (CD-ROM), an integrated circuit (IC) card, or a memory card.

BRIEF DESCRIPTION OF THE DRAWINGS

The invention will be described with reference to the accompanying drawings, wherein like numbers reference like elements, and wherein:

FIG. 7 is a flowchart of an exemplary data writing process according to a first modification;

FIG. 8 is a diagram of a USB memory list;

DESCRIPTION OF EXEMPLARY EMBODIMENTS

First Embodiment

A first embodiment of the invention will be described with reference to the drawings.

Figure 1:
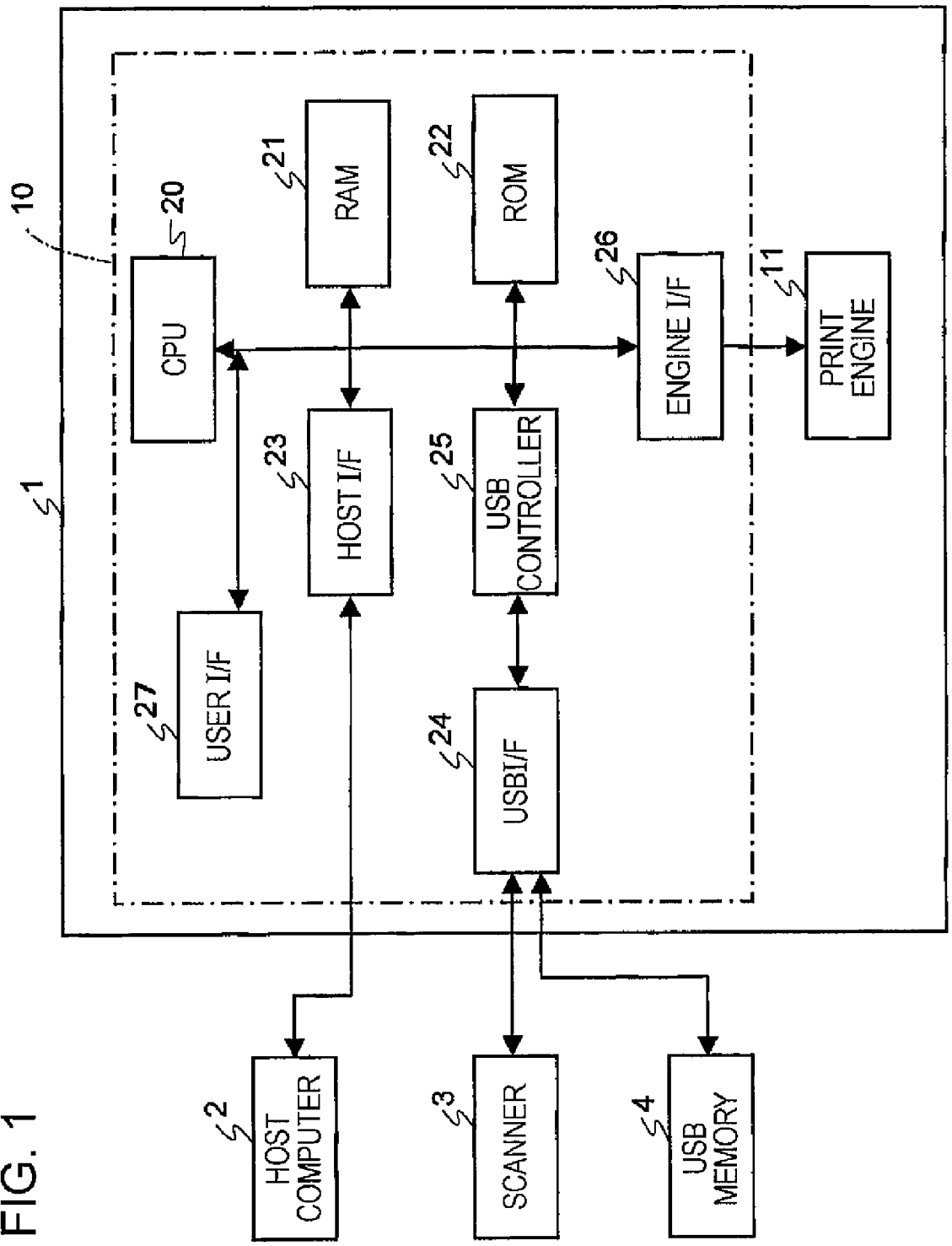
FIG. 1 is a block diagram of the hardware configuration of a printer.

FIG. 1 shows the hardware configuration of a printer according to the first embodiment. As shown in FIG. 1, a printer 1 includes a data processor 10 for performing various processes and a print engine 11 for receiving print data from the data processor 10 and printing an image. The printer 1 is connected to a host computer 2.

The data processor 10 includes a central processing unit (CPU) 20, a random access memory (RAM) 21, a read-only memory (ROM) 22, a host interface (I/F) 23 for interfacing with the host computer 2, a USB I/F 24, a USB controller 25, an engine I/F 26, and a user I/F 27. The elements of the data processor 10 are connected to one another so that data can be exchanged among the elements.

As shown in FIG. 1, a scanner 3 and a USB device, such as a USB memory 4 (recording medium), which is a recording medium with an internal rewritable non-volatile flash memory, can be appropriately connected to the printer 1 via the USB I/F 24 to meet the needs of a user.

The CPU 20 is a portion that controls various processes performed by the data processor 10. The ROM 22 is a data-rewritable non-volatile memory, such as a flash ROM or an electrically erasable programmable ROM (EEPROM). The RAM 21 is a general memory used as a working memory for various processes. Data to be printed, which is transmitted from the host computer 2, is stored in the RAM 21.

The USB I/F 24 is a connection portion to which a device such as the scanner 3 or the USB memory 4 is actually connected. That is, an external USB device is connected to the USB I/F 24 in a detachable manner. The device connected to the USB I/F 24 and the data processor 10 are electrically connected with each other via a data line for transmitting and receiving data within the connection portion and a power supply line for supplying power from the data processor 10 to the USB device.

The USB controller 25 controls transmission and reception of data between the data processor 10 and the device connected to the USB I/F 24.

The USB memory 4 inserted in the USB I/F 24 operates as a memory device by receiving power supplied from the USB I/F 24 via the power supply line. When the USB controller 25 transmits and receives data to and from the USB memory 4 via the data line, the data processor 10 reads and/or writes data from/to data stored in the USB memory 4.

The USB controller 25 monitors the voltage of the power supply line included in the USB I/F 24. In response to a change in the voltage of the power supply line due to insertion or removal of the USB memory 4, the USB controller 25 detects insertion or removal of the USB device. When the USB controller 25 detects insertion/removal of the USB device, the USB controller 25 transmits an insertion/removal signal indicating that the USB device is inserted or removed to the CPU 20. Upon reception of the insertion/removal signal, the CPU 20 performs an interruption process, which will be described subsequently. Regarding the insertion/removal signal, a signal generated upon insertion of the USB device is different from a signal generated upon removal of the USB device.

The USB controller 25 reads USB device identification information from the device connected to the USB I/F 24 and stores the identification information in the RAM 21 or the ROM 22 in the printer 1. The identification information includes, for example, the product's name, the manufacturer's name, the serial number, and the like.

The engine I/F 26 is a portion that allows interfacing between the data processor 10 and the print engine 11. The engine I/F 26 includes a memory (not shown) for temporarily storing data. Data to be printed, which is read from the RAM 21, is accumulated in this internal memory. Processing (data analysis and image generation) such as rendering, color conversion, halftoning, etc. are performed on the data to be printed, and the generated print data is transmitted to the print engine 11.

The user I/F 27 is an interface with the user of the printer 1. The user I/F 27 includes an operation panel, a display panel, and the like.

Specifically, the host I/F 23, the USB controller 25, and the engine I/F 26 each include an application specific integrated circuit (ASIC).

Figure 2:
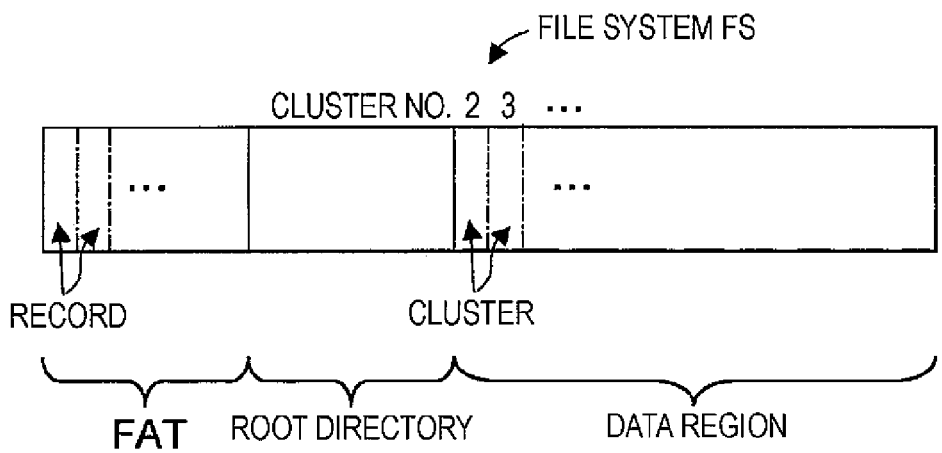
FIG. 2 is a diagram of a file system in a USB memory.

A file system in the USB memory 4 will now be described. A FAT file system is employed as the file system in the USB memory 4 according to the first embodiment. Referring to FIG. 2, a file system FS in the FAT file system includes FAT, a root directory, and a data region.

The data region includes many clusters to which cluster numbers are assigned. A cluster is a processing unit for managing recorded data. The amount of data that can be recorded in one cluster is determined in advance. A file with a data volume greater than one cluster is divided into a plurality of clusters, and the data is recorded in the plurality of clusters.

The file name, creation date, and file volume of a stored file and the cluster number of a first cluster that stores data in that file are recorded in the root directory.

FAT is a management table for keeping track of which clusters include which data stored as files in which sequence. In FAT, records are recorded in units of clusters in which data is stored. Each record stores the cluster number of the next cluster storing the next piece of data. A record corresponding to the last cluster storing data includes a code indicating that this is the last cluster.

When reading data in a file, the first cluster recording the file is read from the root directory. From the next cluster onward, data is sequentially read to the last cluster by following the records in FAT.

When writing a file, data in the file is recorded in a cluster in which no data is recorded, and the root directory and FAT corresponding to the data in the recorded file are updated, thereby maintaining consistency among FAT, the root directory, and the data region.

As has been described above, the file system FS functions properly when the logical consistency is maintained among FAT, the root directory, and the data region. Otherwise, the correct data cannot be accessed.

In particular, when accessing the file system FS is interrupted while data is being written to the file system FS, the consistency among FAT, the root directory, and the data region becomes impaired. In other words, when the USB memory 4 in which the file system FS is configured is removed from the USB I/F 24 while data is being written, the file system FS in the USB memory 4 becomes unable to function properly.

The data processor 10 according to the first embodiment of the invention performs restoration in order to recover the logical consistency in the file system FS in the USB memory 4 that was removed from the data processor 10 while data was being written to the USB memory 4.

Figure 3:
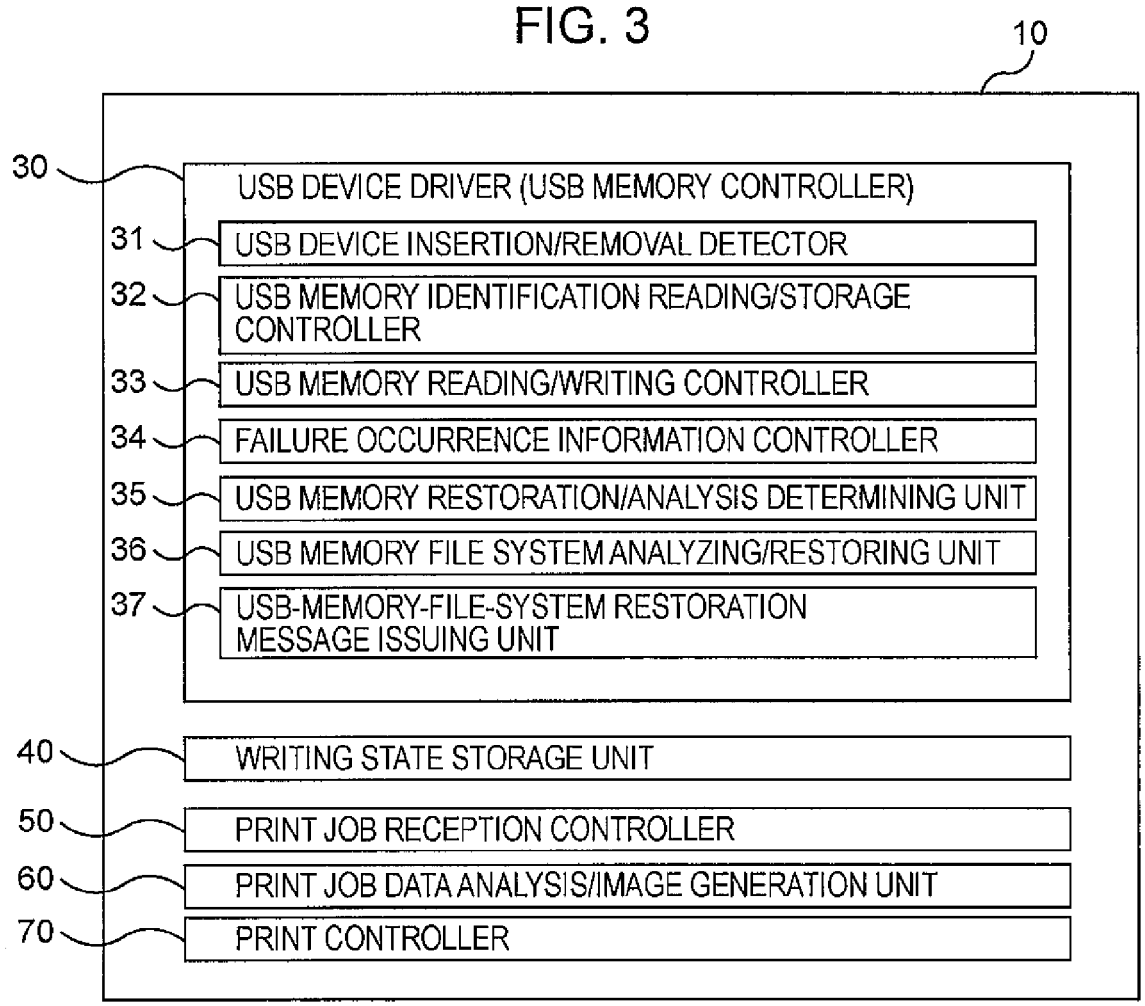
FIG. 3 is a diagram of the configuration of a data processor.

The functional configuration of the data processor 10 will now be described. FIG. 3 shows the functional configuration of the data processor 10. As shown in FIG. 3, the data processor 10 includes a USB device driver (USB memory controller) 30, a writing state storage unit 40, a print job reception controller 50, a print job data analysis/image generation unit 60, and a print controller 70.

The USE device driver 30 includes a USB device insertion/removal detector 31, a USB memory identification information reading/storage controller 32, a USB memory reading/writing controller 33, a failure occurrence information controller 34, a USE memory restoration/analysis determining unit 35, a USB memory file system analyzing/restoring unit 36, and a USB-memory-file-system restoration message issuing unit 37.

The USB device driver 30 identifies a USB device on the basis of the identification information of the USE device. If a connected USE device is a recording medium, such as the USE memory 4, the USB device driver 30 recognizes a file system configured in the recording medium and controls accessing of the file system. When the USE device is inserted in or removed from the USE I/F 24, the USE device driver 30 detects insertion or removal of the USB device. The USE device driver 30 performs determination whether to restore the file system configured in the USE memory 4, which is a feature of the data processor 10. The USE device driver 30 includes the CPU 20, the RAM 21, the ROM 22, the USE I/F 24, the USB controller 25, and the like, which are described above.

The USE device insertion/removal detector 31 is a portion that detects insertion or removal of the USE device in/from the USE I/F 24. The USB memory identification information reading/storage controller 32 is a portion that reads, when the USB memory 4 is inserted in the USB I/F 24, identification information of the USB memory 4, namely, unique information including the "serial number", "manufacturer's name", and "product's name", from the USB memory 4 and stores the information in a predetermined region of the writing state storage unit 40.

The USB memory reading/writing controller 33 is a portion that recognizes a file system configured in the inserted USB memory 4 and controls accessing of the file system. The USB memory reading/writing controller 33 also controls the writing state storage unit 40 when a file is being written to the USB memory 4. The failure occurrence information controller 34 is a portion that stores failure occurrence information indicating that the USB memory 4 was removed while a file was being written to the USB memory 4 in the writing state storage unit 40.

When the USB memory 4 is inserted in the USB I/F 24, the USB memory restoration/analysis determining unit 35 determines whether it is necessary to perform analysis regarding restoration of the file system FS in the USB memory 4 on the basis of information in the writing state storage unit 40 of the data processor 10.

When it is determined by the USB memory restoration/analysis determining unit 35 that it is necessary to perform analysis, the USB memory file system analyzing/restoring unit 36 analyzes the file system FS in the USB memory 4 and, as a result, when it is necessary to restore the file system FS, the USB memory file system analyzing/restoring unit 36 restores the file system FS.

when the USB device driver 30 determines that it is necessary to perform analysis in order to restore the file system FS in the inserted USB memory 4, the USB-memory-file-system restoration message issuing unit 37 issues a message indicating that it is necessary to analyze the file system FS to the user I/F 27. During analysis or restoration of the file system FS, the USB-memory-file-system restoration message issuing unit 37 issues a message indicating that the file system FS is being analyzed or restored.

The writing state storage unit 40 holds information indicating whether the USB memory 4 was removed while the USB device driver 30 was writing data to the USB memory 4. The writing state storage unit 40 includes a write status information region in which information or a 1-bit flag indicating "0" or "1" is recorded. Control is performed to record "1" when data is being written or "0" when the writing of data is completed or when data is not being written.

The writing state storage unit 40 includes a failure occurrence information region as the next region in which a 1-bit flag indicating "0" or "1" is recorded. When the USB memory 4 was removed while the above write status information was "1", "1" is maintained. That is, failure occurrence information is information indicating whether the USB memory 4 was removed while data was being written. The initial value of the failure occurrence information is "0". When the failure occurrence information becomes unnecessary, the flag is set to "0".

In addition, the writing state storage unit 40 may include a region for storing information unique to the USB memory 4. Specifically, the writing state storage unit 40 includes a region (inserted memory portion) for storing information unique to the USB memory 4 inserted in the printer 1 at that time and a region (USB memory list) for holding a list of information unique to the USB memory 4 that was removed during writing. The writing state storage unit 40 includes, for example, the ROM 22 or the RAM 21.

The print job reception controller 50 is a portion that allows reception of a print job from the host computer 2 or the like when the printer 1 receives a print request. The print job data analysis/image generation unit 60 is a portion that analyzes data in the received print job to generate image data. The print controller 70 is a portion that instructs the print engine 11 to perform printing based on the generated data. The print job reception controller 50, the print job data analysis/image generation unit 60, and the print controller 70 include the CPU 20, the RAM 21, the ROM 22, the host I/F 23, the engine I/F 26, and the like.

Each element of the data processor 10 shown in FIG. 3 is implemented by the CPU 20 reading and executing a control program stored on the ROM 22. That is, each element of the data processor 10 starts functioning when the CPU 20 executes the control program. The control program may be stored in advance on the ROM 22. Alternatively, for example, the control program may be supplied from an external source via a computer-readable recording medium, such as the USB memory 4 or a memory card, and then stored on the ROM 22.

Figure 4:
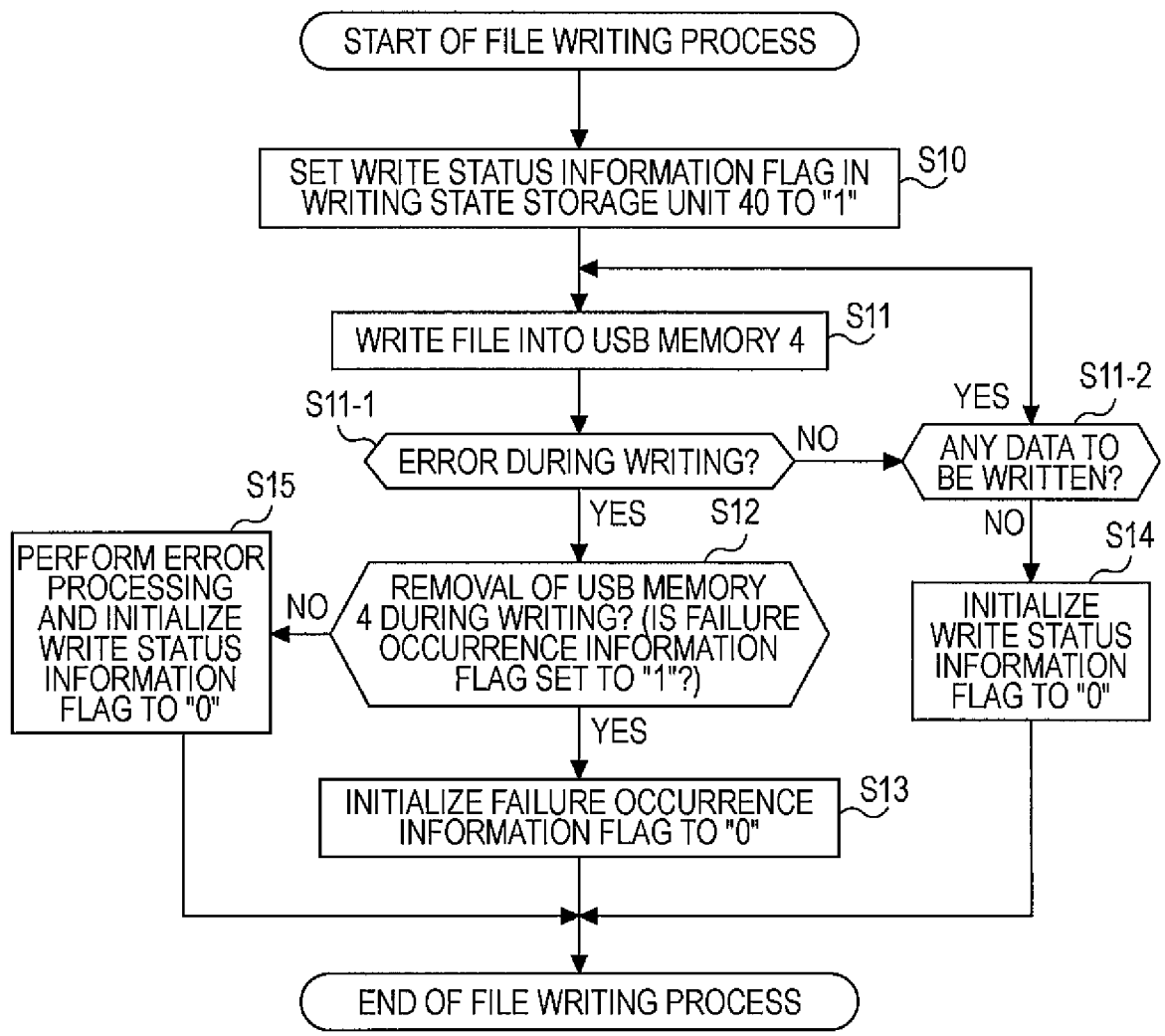
FIG. 4 is a flowchart of an exemplary data writing process.

A process performed by the data processor 10 will now be described in detail in accordance with flowcharts. FIG. 4 is a flowchart showing an exemplary process of writing data to the USB memory 4. For example, when the host computer 2 sends a command to print a file in a print job and to save the file in the USB memory 4 or when the user I/F 27 sends a command to write an image data file captured using the scanner 3 into the USB memory 4, the USB device driver 30 starts a file writing process.

In step S10, prior to the actual writing of data, the USB memory reading/writing controller 33 sets write status information indicating that data is being written in the write status information region of the writing state storage unit 40. Specifically, the write status information or the flag "1" indicating that data is being written is stored in the RAM 21. Although various types of information and flags are stored in predetermined regions of the RAM 21 in the first embodiment, such information may alternatively be stored in the ROM 22 or a non-volatile memory such as a hard disk (not shown).

In step S11, the USB memory reading/writing controller 33 accesses the file system FS in the USB memory 4 and writes data in the file to be written.

In step S11-1, the USB memory reading/writing controller 33 monitors whether an error occurred while writing the file. Specifically, since the writing is performed a plurality of times in predetermined units, whether an error occurred during writing is determined by whether the writing of the unit data has been completed without errors every time the writing is performed. When it is determined that the writing was not completed properly and an error occurred, the process proceeds to step S12.

In step S12, the USB memory reading/writing controller 33 determines whether the cause of the error during writing is the removal of the USB memory 4 during writing. This is done by referring to the failure occurrence information, which will be described subsequently. If the flag of the failure occurrence information is "1" (yes), it is determined that the USB memory 4 has been removed during writing, and the process proceeds to step S13. When the USB memory 4 is removed while data is being written to the USB memory 4, as has been described above, it is determined that it is very likely that a failure has occurred in the file system FS in the USB memory 4.

The failure occurrence information is set by a process (an interruption process) described below. The failure occurrence information is information that will be set to "1" by the USB device driver 30 when the USB memory 4 is removed while the write status information is "1". If the failure occurrence information is "1", it indicates that it is very likely that a failure occurred in the file system FS in the USB memory 4.

In step S13, the USB memory reading/writing controller 33 maintains the flag of the write status information as "1" and initializes the failure occurrence information to "0", and the writing process shown in FIG. 4 ends.

In contrast, when it is determined in step S11-1 that no error occurred, the process proceeds to step S11-2, and the USB memory reading/writing controller 33 returns to step S11 if there is any data to be written. Otherwise, it means that all the data in the file to be written has been written to the USB memory 4, and the process proceeds to step S14. In step S14, since the writing of the data is completed without any failures during writing, the flag of the write status information is initialized to "0", and the writing process shown in FIG. 4 ends.

When it is determined in step S12 that an error occurred, whereas the USB memory 4 has not been removed, the process proceeds to step S15. In this case, the cause of the error may be, for example, that the file exceeds the memory capacity or the USB memory 4 is writing-prohibited. In this case, error processing is performed to issue an error message indicating the details of the error to the user I/F 27. Since there is no inconsistency in the FAT system in the USB memory 4, the USB memory reading/writing controller 33 changes the flag of the write status information back to "0", and the file writing process ends.

A process (an interruption process) performed upon removal of the USB memory 4 will be described. In the case of the removal of the USE memory 4, when the USB device insertion/removal detector 31 detects that the USB memory 4 has been removed, the failure occurrence information controller 34 performs the interruption process, which will be described below with reference to the flowchart shown in FIG. 5.

When the interruption process performed upon removal of the USB memory 4 is started, in step S20, the write status information is read from the writing state storage unit 40, i.e., a predetermined region of the RAM 21.

In step S21, it is determined whether the USB memory 4 was removed during writing. Since the flag indicating that the data is being written was set to "1" in step S10 described above, when the flag of the write status information is "1", it is determined that the USB memory 4 was removed during writing (yes), and the process proceeds to step S22. When the flag is not "1" (no), it is determined that the USB memory 4 was not removed during writing, and the interruption process ends.

In step S22, the failure occurrence information indicating that it is very likely that a failure occurred in the file system FS because the USB memory 4 was removed while the data was being written is stored. Specifically, the failure occurrence information or the flag "1" indicating that it is very likely that a failure occurred is stored in a predetermined region of the RAM 21. When the processing in step S22 is completed, the interruption process ends.

If the interruption process, which is performed upon removal of the USB memory 4, is performed while the file is being written, the CPU 20 returns to the file writing process upon completion of the interruption process and performs steps subsequent to the interrupted step. For example, when the USB memory 4 was removed while the data was being written (step S11) in the file writing process, the interruption process is performed in a state where the flag of the write status information is "1". Thus, the interruption process sets the flag of the failure occurrence information to "1". Upon completion of the interruption process, the CPU 20 returns to the file writing process in a state where the flag of the failure occurrence information is "1". Since the USB memory 4 has been removed in step S1 and it has been impossible to write data to the USB memory 4, the process proceeds to step S12.

Since the failure occurrence information indicates "1" in step S12, the process proceeds to step S13. The file writing process ends in a state where the flag of the write status information is "1".

In contrast, in the event of the removal of the USB memory 4 while no data is being written to the USB memory 4, the flag of the write status information remains "0" or the initial value. Thus, the interruption process ends while the flag of the failure occurrence information remains "0" or the initial value.

A process performed upon insertion of a USB device, such as the USB memory 4, will be described. When a USB device is inserted, the USB device driver 30 receives an insertion/removal signal from the USB device insertion/removal detector 31 and performs an interruption process shown in FIG. 6.

When the interruption process performed upon insertion of a USB device is started, in step S30, the USB device insertion/removal detector 31 refers to identification information of the USB memory 4 and determines whether the inserted device is the USB memory 4. When the inserted device is the USB memory 4 (yes), the process proceeds to step S31. When the inserted device is not the USB memory 4 (no), the interruption process ends.

In step S31, the USB memory restoration/analysis determining unit 35 determines whether the USB memory 4 was previously removed while the data was being written. The CPU 20 reads the value of the flag of the write status information from the RAM 21. If the flag of the write status information is "1" (yes), it means that the USB memory 4 was previously removed while the data was being written. It is thus determined that it is necessary to analyze the file system FS in the inserted USB memory 4 in order to restore the file system FS, and the process proceeds to step S31-1. In contrast, if the flag of the write status information read from the RAM 21 is "0" (no), it means that the USB memory 4 was not previously removed while the data was being written. It is thus determined that it is unnecessary to restore the file system FS, and the process ends.

In step S31-1, the USB memory file system analyzing/restoring unit 36 analyzes the file system FS in the inserted USB memory 4. When it is determined, as a result of the analysis, that it is necessary to restore the file system FS since there is a logical inconsistency in the file system FS (yes in step S31-2), the process proceeds to step S32. In contrast, when it is determined, as a result of the analysis, that it is unnecessary to restore the file system FS (no in step S31-2), the process proceeds to step S33.

In step S32, the USB memory file system analyzing/restoring unit 36 restores the file system FS in the USB memory 4. Specifically, the CPU 20 accesses the file system FS in the USB memory 4 and restores the file system FS by replacing logically-inconsistent data in FAT, the root directory, and the data region with consistent data.

In step S33, the USB memory file system analyzing/restoring unit 36 initializes the flag of the write status information to "0", and the interruption process ends.

Accordingly, the data processor 10 restores the file system FS when the USB memory 4 that was previously removed from the USB I/F 24 while the data was being written is again inserted in the USB I/F 24. Since there will be no inconsistency in the file system FS when the recording medium is removed during reading, the file system FS is not restored or analyzed.

The first embodiment of the invention has the following advantages.

(1) Since it is determined that it is necessary to analyze the file system FS in the USB memory 4 that was previously removed from the USB I/F 24 while data was being written in order to restore the file system FS, the USB memory 4 having the file system FS that needs to be restored can be accurately detected. (2) Only the USB memory 4 that is likely to have the file system FS in which a failure occurred due to the removal of the USB memory 4 while data was being written is analyzed to determine whether to restore the file system FS. Thus, the normal file system FS can be efficiently maintained. (3) Since the USB memory restoration/analysis determining unit 35 and the USB memory file system analyzing/restoring unit 36 determine the file system FS that needs to be restored, the user is not required to perform determination, and the file system FS in the USB memory 4 can be maintained in an appropriate state. (4) Since it is determined upon insertion of the USB memory 4 into the printer 1 whether it is necessary to perform analyze regarding restoration of the file system FS, it is possible to perform, at an appropriate time, analysis of a recording medium that is inserted in or removed from a machine, such as the printer 1, while it is operating.

while the embodiment of the invention has been described, the invention is not limited to the foregoing embodiment. Various changes and modifications can be made to the invention without departing from the spirit and scope of the invention. Hereinafter, modifications will be described.

First Modification

In a first modification, in the event of the removal of the USB memory 4 while data is being written, this state is indicated not using the above-described write status information, but using the identification information of the removed USB memory 4. Therefore, when the USB memory 4 is removed, the identification information of the USE memory 4 itself is recorded.

FIG. 7 is a flowchart showing an exemplary process of writing data to the USB memory 4. As in the case described with reference to FIG. 4, for example, when the host computer 2 sends a command to print a file in a print job and to save the file in the USE memory 4 or when the user I/F 27 sends a command to write an image data file captured using the scanner 3 into the USE memory 4, the USE device driver 30 starts a file writing process.

In step S40, the USE memory reading/writing controller 33 accesses the file system FS in the USB memory 4 and writes data in the file to be written.

In step S41, the USB memory reading/writing controller 33 monitors whether an error occurred while writing the file. Specifically, since the writing is performed a plurality of times in predetermined units, whether an error occurred during writing is determined by whether the writing of the unit data has been completed without errors every time the writing is performed. When it is determined that the writing was not completed properly and an error occurred, the process proceeds to step S43.

In step S43, the USB memory reading/writing controller 33 determines whether the cause of the error during writing is the removal of the USB memory 4 while writing data to the USB memory 4. Specifically, since the above-described USB device insertion/removal detector 31 detects the removal of the USB memory 4, the above determination is done by the USB memory reading/writing controller 33 referring to the USB device insertion/removal detector 31 for that state.

When it is determined that the USB memory 4 has been removed during writing (yes), the process proceeds to step S45. In this case, as has been described above, it is determined that it is very likely that a failure has occurred in the file system FS in the USB memory 4.

In step S45, the USB memory reading/writing controller 33 writes the identification information (unique information) of the USB memory 4 that was removed during writing in the USE memory list in the writing state storage unit 40 described above. Specifically, since the identification information of the inserted USB memory 4 is written upon insertion of the USB memory 4 in a region (inserted memory portion) in the writing state storage unit 40 for storing information unique to the USE memory 4 inserted in the printer 1 at that time, this unique information is written in the USB memory list.

FIG. 8 shows an example of the USE memory list. In this example, a list of writing state information I is recorded. That is, the unique information including the "serial number", "manufacturer's name", and "product's name" of the USE memory 4 is recorded. The unique information employed as the identification information is only an example, and the unique information to be recorded may be one or two of these pieces of information or may be other information.

When writing to the USB memory list is completed in this manner, the writing process shown in FIG. 7 ends.

In contrast, when it is determined in step S41 that no error occurred, the process proceeds to step S42, and the USE memory reading/writing controller 33 returns to step S40 if there is any data to be written. Otherwise, it means that all the data in the file to be written has been written to the USE memory 4, and the writing process shown in FIG. 7 ends.

When it is determined in step S43 that an error occurred, whereas the USE memory 4 has not been removed, the process proceeds to step S44. In this case, the cause of the error may be, as has been described above, that the file exceeds the memory capacity or the USB memory 4 is writing-prohibited. The USE memory reading/writing controller 33 performs error processing to issue an error message indicating the details of the error to the user I/F 27. The file writing process ends.

Figure 9:
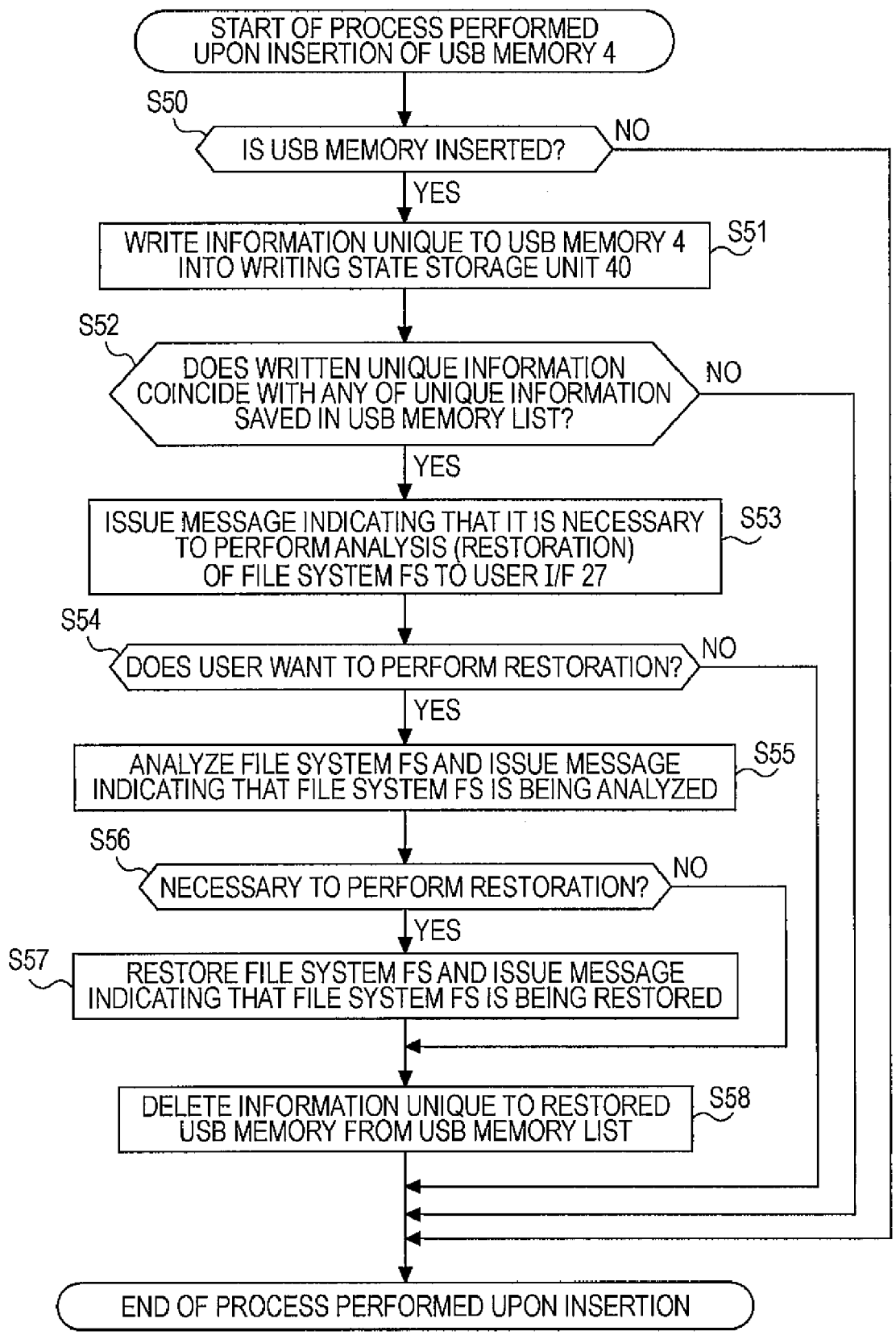
FIG. 9 is a flowchart of a process performed upon insertion of a USB device according to the first modification.

A process performed upon insertion of a USE device, such as the USB memory 4, according to the first modification will be described. When the USB device is inserted, the USE device driver 30 receives an insertion/removal signal from the USE device insertion/removal detector 31 and performs an interruption process shown in FIG. 9.

When the interruption process performed upon insertion of a USE device is started, in step S50, the USE device insertion/removal detector 31 refers to identification information of the USE memory 4 and determines whether the inserted device is the USE memory 4. When the inserted device is the USE memory 4 (yes), the process proceeds to step S51. When the inserted device is not the USB memory 4 (no), the interruption process ends.

In step S51, the USB memory identification information reading/storage controller 32 reads the identification information (the above-described unique information) of the inserted USB memory 4 and writes the identification information in the above-described inserted memory portion in the writing state storage unit 40.

In step S52, the USB memory restoration/analysis determining unit 35 determines whether the inserted USB memory 4 was previously removed while data was being written. Specifically, the USB memory restoration/analysis determining unit 35 reads the unique information written in the inserted memory portion and checks whether information coinciding with the unique information is saved in the USB memory list. In other words, it is checked whether there is any unique information saved in the USB memory list that coincides with the read unique information.

When there is unique information that coincides with the read unique information (yes), that is, when the identification information of the inserted USB memory 4 is saved in the USB memory list, the process proceeds to step S53. In contrast, when there is no unique information that coincides with the read unique information, the interruption process ends.

In step S53, since the inserted USB memory 4 was previously removed while the file (data) was being written, it is highly necessary to restore the file system FS, and it is thus necessary to perform analysis for restoration. Therefore, the USB-memory-file-system restoration message issuing unit 37 issues a message indicating that it is necessary to perform analysis for restoration to the user I/F 27. As a result, the message is displayed on a display panel or the like of the user I/F 27.

In step S54, the user responds to the displayed message using an operation button or the like of the user I/F 27. If the user wants to restore the file system FS (by performing analysis) (yes), the process proceeds to step S55. If the user does not want to restore the file system FS (no), the interruption process ends. When the user does not want to restore the file system FS, the process proceeds to step S58 described below, and the information unique to the USB memory 4 may be deleted from the USB memory list. In this case, it is preferable to ask the user to confirm deletion prior to deletion by displaying a message such as "Can a similar confirmation be omitted in future?". When the confirmation is received and the unique information is deleted from the USB memory list, the message indicating that it is necessary to perform analysis for restoration will not be displayed as long as the USB memory 4 is not removed during writing.

In step S55, the USB memory file system analyzing/restoring unit 36 analyzes the file system FS in the inserted USB memory 4. The USB-memory-file-system restoration message issuing unit 37 issues a message indicating that the file system FS is being analyzed to the user I/F 27, and the message is displayed to the user. Since this analysis generally takes a relatively long period of time, it is effective to display such a message to the user.

When it is determined, as a result of the analysis, that it is necessary to restore the file system FS since there is a logical inconsistency in the file system FS (yes in step S56), the process proceeds to step S57. In contrast, when the analysis result shows that it is unnecessary to restore the file system FS (no in step S56), the process proceeds to step S58.

In step S57, the USB memory file system analyzing/restoring unit 36 restores the file system FS in the USB memory 4, as has been described above. The USB-memory-file-system restoration message issuing unit 37 issues a message indicating that the file system FS is being restored to the user I/F 27, and the message is displayed to the user.

In step S58, the USB memory file system analyzing/restoring unit 36 deletes the information unique to the USB memory 4 from the USB memory list, and the interruption process ends.

Alternatively, in step S56, the analysis result showing whether it is necessary to restore the file system FS may be displayed to the user. When the analysis result shows that it is necessary to restore the file system FS, the user may decide whether or not to restore the file system FS or whether or not to delete the corresponding file.

Alternatively, no message may be displayed in step S53. In this case, the user is not prompted to confirm the analysis, and the process proceeds to the analysis step (step S55).

As has been described above, in the first modification, only the USB memory 4 that coincides with the unique information, such as the "serial number", "manufacturer's name", and "product's name" saved in the USB memory list, is to be restored. In an operating environment where a plurality of USB memories 4 are connectable, only the USB memory 4 that was previously removed during writing is subjected to processing for restoration. It is thus possible to accurately determine the file system FS that needs to be restored and to efficiently perform the steps to maintain the normal file system FS.

Figure 5:
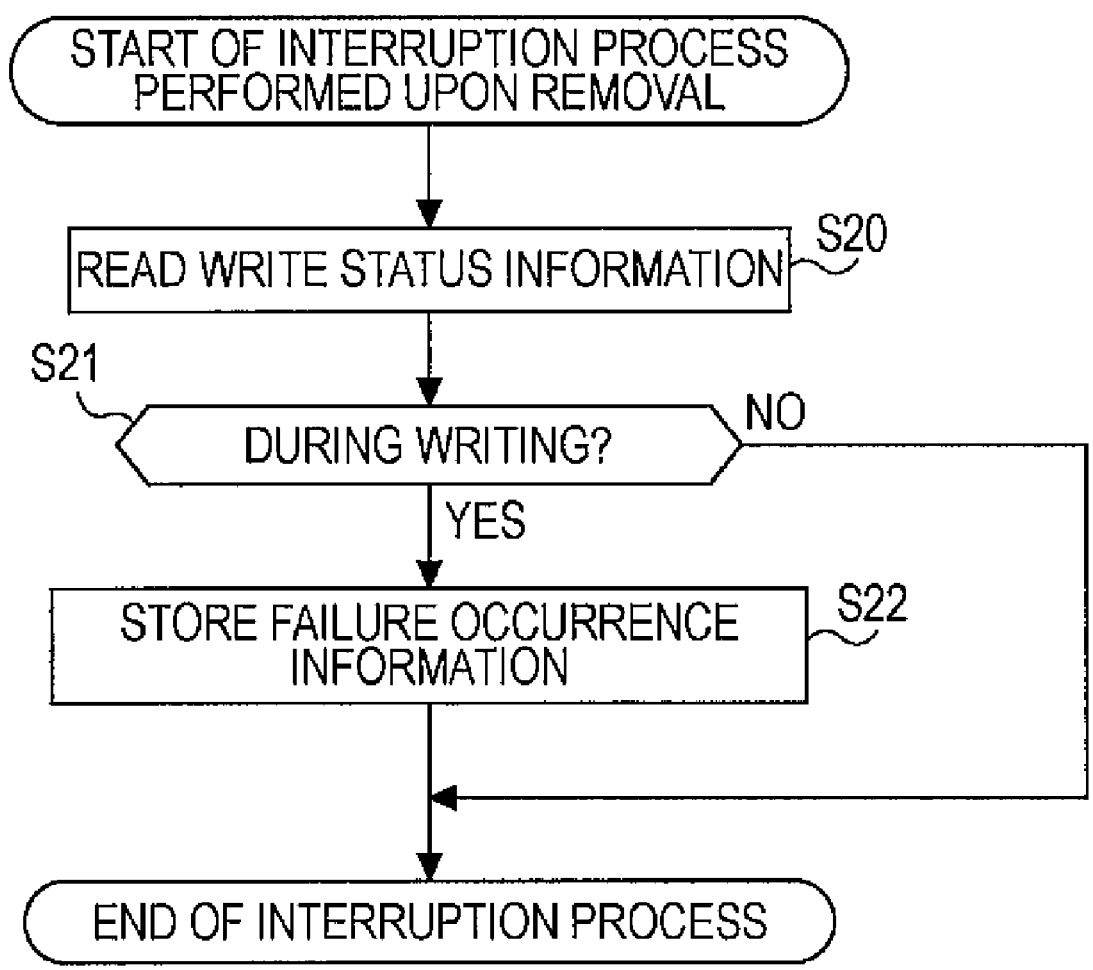
FIG. 5 is a flowchart of an interruption process performed upon removal of the USB memory.

In the first modification, the interruption process performed upon removal of the USB memory 4, which has been described with reference to FIG. 5, is not required. It is thus possible to perform an efficient control without redundancy, compared with the first embodiment. In the first embodiment, as in the first modification, determination of whether the USB memory 4 was removed when an error occurred while data was being written to the USB memory 4 can be performed, at that time (at the time the error occurred), by the USB memory reading/writing controller 33 inquiring the USB device insertion/removal detector 31.

In the first modification, the user is informed that it is necessary to perform analysis for restoration, that the file system FS is being analyzed, and that the file system FS is being restored. The user can thus accurately understand the condition and the processing state of the USB memory 4 being used and wait for completion of the processing at ease. Informing the user is not limited to the first modification and can also be performed in other cases, such as the first embodiment.

Second Modification

Figure 10:
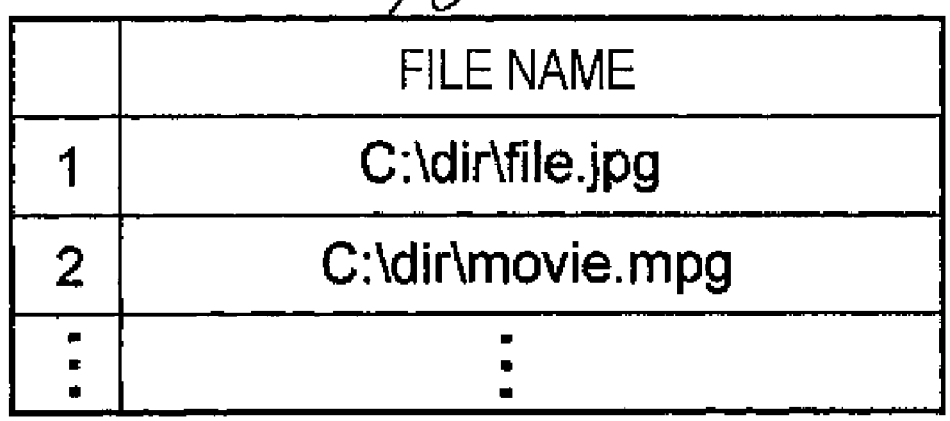
FIG. 10 is a diagram of exemplary writing state information I in which file names are recorded.

When the USB memory 4 is removed while data is being written, the name of a file being written may be recorded. For example, as shown in FIG. 10, the name of a file that is very likely to contain a failure due to the removal of the USB memory 4 during writing can be recorded as the writing state information I, together with a path for recording the file, in the writing state storage unit 40.

The recorded file name can be used to restrict files to be analyzed and restored. In the first embodiment and the first modification described above, when it is determined that it is necessary to perform analysis upon reconnection of the USB memory 4, the recorded file name can inform the user of the file name of a file that needs to be restored in the subsequent analysis and restoration processing. Therefore, only the file that is on the recorded path is to be processed. The processing time required for analysis and restoration can be reduced. Alternatively, the file system FS may be restored by deleting the corresponding file.

The determination of whether it is necessary to perform analysis upon insertion of the USB memory 4 may be performed only on the basis of the recorded file name. That is, upon insertion of a recording medium, it can be determined that it is necessary to perform analysis if the inserted recording medium has recorded a file that coincides with the recorded file name in the writing state information I. In such a case, the file name may replace the write status information in the first embodiment or the identification information of the USB memory 4 in the first modification.

The determination of whether it is necessary to perform analysis for restoration upon insertion of the USB memory 4 may be performed on the basis of the write status information and the file name in the first embodiment and on the basis of the memory identification information and the file name in the first modification. Accordingly, it becomes possible to determine the USB memory 4 having a file system FS that needs to be restored in a more reliable manner.

Third Modification

In the foregoing embodiment, the case in which the recording medium is the USB memory 4 has been described by way of example. However, the recording medium is not limited to the USB memory 4, and the recording medium may be a removable memory, such as a memory card. Alternatively, the recording medium may correspond to an external storage device, such as a hard disk drive, connected via USB. Needless to say, the interface is not limited to USB and may include various interfaces, such as IEEE 1394.

Fourth Modification

Figure 6:
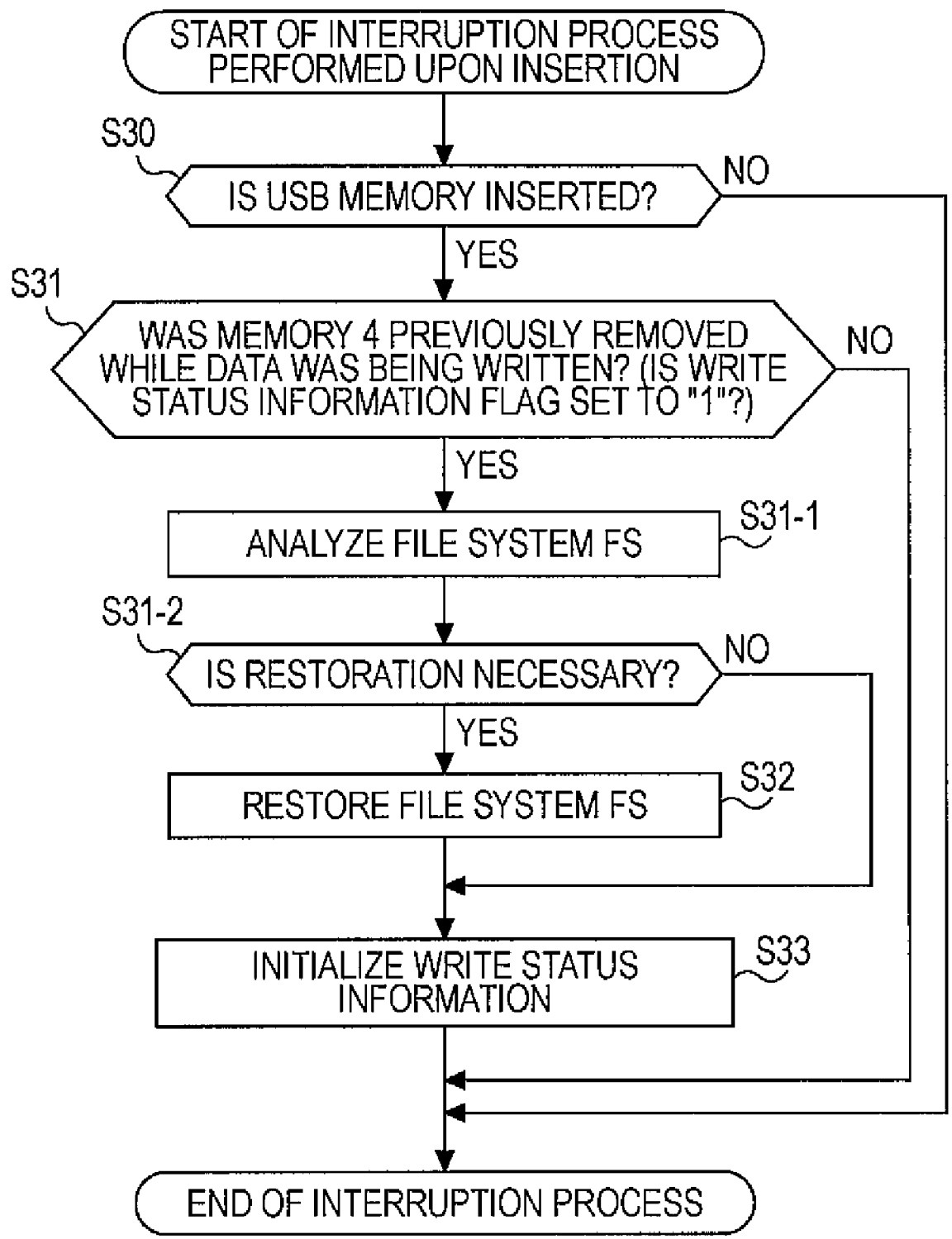
FIG. 6 is a flowchart of an interruption process performed upon insertion of a USB device.

In the process shown in FIG. 6, the file system FS may only be analyzed and may not be restored.

Fifth Modification

In the foregoing embodiment, the data processor included in the printer 1 has been described. The data processor according to the embodiment of the invention can be applied to various apparatuses, such as a PC, a scanner, a fax machine, a digital video camera, and a television.

Sixth Modification

In the foregoing embodiment, the functions of the data processor 10 are implemented by the CPU 20 executing a control program. According to a sixth modification, the functions of the data processor 10 described above may be implemented using a hardware circuit, such as ASIC. Needless to say, some of the functions may be implemented using a hardware circuit, and the remaining functions may be implemented by software.

In the foregoing embodiment, the necessity to perform analysis is determined on the basis of the write status information or the like upon insertion of the USB memory 4. Since the case where it is determined that it is necessary to perform analysis is the case where the USB memory 4 was previously removed during writing, it is very likely that it is necessary to restore the file system FS in the USB memory 4. Therefore, the determination based on the write status information can be regarded as the determination of the necessity to restore the USB memory 4. In this way, the analysis corresponds to searching for an object to be restored, and the processing involving this analysis and the actual restoration can be referred to as "restoration". Accordingly, in the foregoing embodiment, the USB memory restoration/analysis determining unit 35 serving as a restoration determining unit determines whether it is necessary to perform restoration, and the USB memory file system analyzing/restoring unit 36 serving as a restoration unit performs restoration.

The entire disclosure of Japanese Patent Application Nos: 2005-238353, filed Aug. 19, 2005 and 2006-165894, filed Jun. 15, 2006 are expressly incorporated by reference herein.

What is claimed is:

1. A data processing apparatus for writing data to a recording medium having a predetermined file system configured therein, the apparatus comprising:

an insertion portion that removably holds the recording medium, the data processing apparatus writing data to the recording medium inserted in the insertion portion;

an insertion/removal detector that detects that the recording medium is inserted in or removed from the insertion portion;

a writing state storage unit that stores, when the insertion/removal detector detects removal of the recording medium, a data writing state upon removal of the recording medium;

a restoration/analysis determining unit that determines, when the insertion/removal detector detects insertion of the recording medium, whether it is necessary to perform analysis regarding restoration of the file system configured in the inserted recording medium on the basis of the state stored in the writing state storage unit; and a message issuing unit that issues a message regarding the restoration to a user.

2. The data processing apparatus according to claim 1, wherein the writing state storage unit stores information indicating whether the recording medium is removed from the insertion portion while data is being written to the recording medium, and when the restoration/analysis determining unit refers to the information stored in the writing state storage unit and determines that the recording medium is removed from the insertion portion while data is being written to the recording medium, the restoration/analysis determining unit determines that it is necessary to perform analysis regarding restoration of the file system in the recording medium inserted in the insertion portion.

3. The data processing apparatus according to claim 2, wherein the writing state storage unit further stores a file name of a file being written to the recording medium when removal of the recording medium is detected while data is being written to the recording medium.

4. The data processing apparatus according to claim 2, further comprising a file system analyzing and restoring unit that analyzes or analyzes and restores the file system in the recording medium determined to be necessary to be analyzed.

5. The data processing apparatus according to claim 1, wherein when removal of the recording medium from the insertion portion is detected while data is being written to the recording medium, the writing state storage unit stores identification information for identifying the removed recording medium, and when the identification information stored in the writing state storage unit coincides with identification information of the inserted recording medium, the restoration/analysis determining unit determines that it is necessary to perform analysis regarding restoration of the file system in the recording medium inserted in the insertion portion.

6. The data processing apparatus according to claim 1, wherein when removal of the recording medium from the insertion portion is detected while data is being written to the recording medium, the writing state storage unit stores a file name of a file being written to the recording medium, and when the file name stored in the writing state storage unit coincides with a file name of a file stored in the recording medium inserted in the insertion portion, the restoration/analysis determining unit determines that it is necessary to perform analysis regarding restoration of the file system in the recording medium inserted in the insertion portion.

7. The data processing apparatus according to claim 6, further comprising a file system analyzing and restoring unit that analyzes or analyzes and restores data in the file having the file name that coincides with the file name stored in the writing state storage unit, the file being in the recording medium determined to be necessary to be analyzed.

8. A data processing apparatus for writing data to a recording medium having a predetermined file system configured therein, the apparatus comprising:

an insertion portion that removably holds the recording medium, the data processing apparatus writing data to the recording medium inserted in the insertion portion;

an insertion/removal detector that detects that the recording medium is inserted in or removed from the insertion portion;

a writing state storage unit that stores, when the insertion/removal detector detects removal of the recording medium, a data writing state upon removal of the recording medium;

a restoration determining unit that determines, when the insertion/removal detector detects insertion of the recording medium, whether it is necessary to restore the file system configured in the inserted recording medium on the basis of the state stored in the writing state storage unit; and a message issuing unit that issues a message regarding the restoration to a user.

9. A data processing method for writing data to a recording medium inserted in an insertion portion that removably holds the recording medium having a predetermined file system configured therein, the method comprising:

detecting that the recording medium is inserted in or removed from the insertion portion;

storing, when removal of the recording medium is detected, a data writing state upon removal of the recording medium;

determining, when insertion of the recording medium is detected, whether it is necessary to perform analysis regarding restoration of the file system configured in the inserted recording medium on the basis of the stored state; and issuing a message regarding the restoration to a user.

10. A computer-readable recording medium having a control program recorded thereon for writing data to another recording medium inserted in an insertion portion that removably holds the another recording medium having a predetermined file system configured therein, the program allowing a controller of a data processing apparatus having the insertion portion to execute a process comprising:

detecting that the another recording medium is inserted in or removed from the insertion portion;

storing, when removal of the another recording medium is detected, a data writing state upon removal of the another recording medium;

determining, when insertion of the another recording medium is detected, whether it is necessary to perform analysis regarding restoration of the file system configured in the inserted another recording medium on the basis of the stored state; and issuing a message regarding the restoration to a user.

* * * * *